United States Patent Office 3,094,872
Patented June 25, 1963

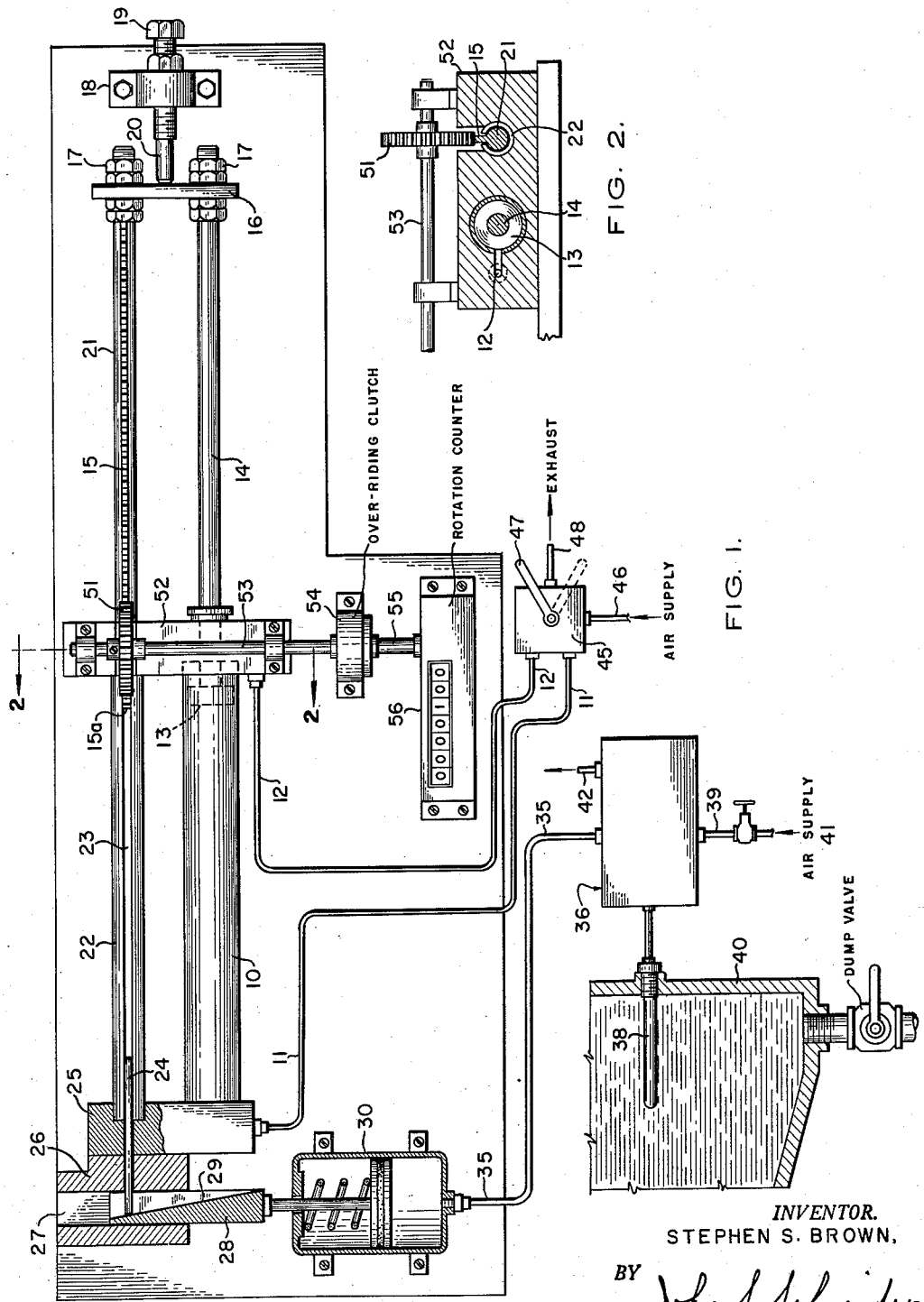

3,094,872
COMPENSATOR APPARATUS
Stephen S. Brown, La Porte, Tex., assignor, by mesne assignments, to Jersey Production Research Company, Tulsa, Okla., a corporation of Delaware
Filed Mar. 11, 1957, Ser. No. 645,264
15 Claims. (Cl. 73—223)

This invention generally concerns a device for compensating for volumetric variations in metering tanks or vessels. In a specific application the invention concerns a device for compensating volumetric variations resulting from temperature changes within metering tanks. The invention also concerns, in a more specific aspect, automatically compensating for volumetric changes resulting from temperature changes in the metering tank in each fill-discharge cycle of operation.

Heretofore, endeavors to compensate for expansion and contraction of the liquid within liquid dump type meters were concerned with changing the actual volume of the meter tank. The device of this invention does not vary the actual volume of the tank, instead compensation for volumetric variations is effected by controlling the amount of rotation of a dump counter which records or registers during each fill-discharge cycle.

Thus a constant correction for a volumetric change may be applied to the counter to compensate for a constant volumetric difference between the volume of the tank and a standard volume or the correction may be varied in proportion to variable temperature changes of the liquid.

Hence, an object of this invention is to provide a device for compensating for volume variations of a meter which does not change the actual volume of the meter tank.

A further object of this invention is to provide a device which accurately compensates for volume variations of a liquid meter, whether the volume variation is caused by temperature changes or other factors that affect measurement of the liquid, as for example, contamination (basic sediment and water), vaporization, or pressure or whether the volume variation is a selected correction that is to be applied. In each instance the compensation may be automatically made in each fill-discharge cycle.

Briefly, the invention comprises a cylinder, a piston slidably arranged in the cylinder, a piston rod connected to the piston, linearly movable means connected to the piston rod, adjustable stop means positioned at one end of the linearly movable means adapted to limit the movement thereof in one direction, second stop means positioned at the other end of the linearly movable means adapted to limit the movement thereof in an opposite direction, means for translating the linear motion of the linearly movable means into rotational motion, the amount of rotation being proportional to the amount of the linear movement and means connected to the translating means adapted to measure the amount of rotation in one direction.

When temperature variations of the liquid within the vessel or tank are to be compensated, the second stop means comprises a wedge member which is adapted to vary the travel of the linearly movable means in said opposite direction. Movement of the wedge is controlled by means responsive to temperature changes within the metering tank.

For a detailed account of the operation of the invention, reference is made to the drawing wherein:

FIG. 1 is a partly schematic, partly sectional view of the apparatus of the invention including a temperature responsive means connected to a meter vessel; and FIG. 2 is a view taken along lines 2—2 of FIG. 1.

FIGS. 1 and 2 show a cylinder 10 having conduits 11 and 12 connected thereto. A piston 13 is arranged in cylinder 10 and is adapted to move between the conduits 11 and 12. A piston rod 14 is connected to piston 13. A rack 15 is mounted or arranged adjacent piston rod 14 and connected thereto by a plate stop member 16 connected to the rack 15 and piston rod 14 by means of suitable nuts 17. An adjustable stop is arranged adjacent the connecting member 16 and comprises a supporting structure generally designated 18 through which a bolt 19 projects. The end or shaft portion 20 of bolt 19 is adapted to engage or abut against stop member 16 when the rack 15 and piston 14 have moved a selected distance to the right, as seen in FIG. 1. Rack 15 includes a supporting rod member 21 which is slidably arranged and supported in a cylindrically configured shell member 22, which is provided with a longitutinal slit portion 23 through which the teeth of the rack 15 project.

As seen in the left portion of FIG. 1, a floating stop member 24 which may be a rod is arranged in the groove 23 and is adapted to abut the end of the rack 15 when the rack has traveled a sufficient distance to the left. The end of support shell 22 may be suitably mounted in structure such as blocks 25 and 26 through which the floating stop 24 extends. Block 26 is provided with a recessed portion 27. A wedge stop member 28 provided with a tapered surface 20 is mounted for slidable movement in recess 27. The tapered surface 29 is adapted to engage with the left or outer end of floating stop 24. Wedge stop 28 is mounted for movement on a motor member, designated 30. The motor member preferably includes a spring biased piston and is operated by transmitting varying pressure signals to motor 30 which causes the piston and attached wedge stop 28 to move upwardly and downwardly.

Accordingly, motor 30 is connected to a conduit 35, which fluidly communicates the motor and a signal transmission valve means 36 which is responsive to temperature changes within the metering vessel. The temperature control may be any desired type wherein varying pressure signals are transmitted to the motor 30 in response to changes of temperature within a metering tank, such as 40. A suitable device includes a control element such as a valve means 36 and a temperature sensitive bulb 38. A constant fluid pressure is transmitted to the valve means 36 through conduit 39 from the fluid pressure supply source 41. Expansion and contraction of a fluid contained in bulb 38 caused by higher and lower temperatures within the metering vessel 40, respectively, causes valve means 36 to transmit more or less, respectively, of the fluid pressure from the supply 41 through conduit 39 to conduit 35. Fluid pressure from the supply 41 not transmitted to conduit 35 exhausts through a conduit 42. The details of the valve means have not been illustrated since such apparatus and the operation thereof per se form no part of the invention and should be apparent to those skilled in the art. For example, a bellows or piston may be employed for actuating a valve element in valve means 36 for permitting more or less of the supply fluid pressure to enter conduit 35 and motor 30 in response to expansion or contraction, respectively, of the bulb fluid. U.S. Patent No. 1,909,469, entitled "Regulating Apparatus" issued to K. H. Hubbard, discloses one type of temperature control that may be used.

Conduits 11 and 12 are connected, as shown in FIG. 1, to a suitable valve means 45, to which is connected also an air-supply 46 and an exhaust 48. Thus, piston 13 may be actuated by a manual control, such as handle 47 of valve means 45. In one position, valve means 45 transmits fluid pressure from the air-supply 46 to the conduit 12 and at the same time exhausts conduit 11 through conduit 48. In another position, valve means 45 transmits fluid pressure from supply 46 to conduit 11 and at the same time exhausts conduit 12 through conduit 48.

A pinion gear 51 engagedly connects with the teeth of the rack 15. The pinion gear 51 is suitably mounted on a support such as plate and supporting connections 52. A shaft 53 is connected to gear 51 for rotation therewith. Shaft 53 connects with an over-riding clutch 54, which, in turn, is connected to another shaft 55. Shaft 55 connects to a suitable rotation counter 56, which registers the rotation of shaft 55. The clutch 54 engages shaft 55 when the rotation of shaft 53 is clockwise. However, when the rotation of the shaft is counterclockwise, shaft 55 is disengaged and does not rotate with shaft 53. Thus when the rack 15 moves to the left, pinion gear 51 rotates clockwise, thereby rotating shafts 53 and 55. However, when rack 15 moves to the right thereby rotating pinion gear 51 counterclockwise, shafts 53 and 55 are disconnected and shaft 55 does not rotate with shaft 53. Thus, the rotation counter registers only when rack 15 moves to the left as seen in FIG. 1.

In operation when using the device as a volume calibrator, the handle 47 is turned to transmit fluid pressure from supply 46 to conduit 11 and cylinder 10. In the meantime, conduit 12 is exhausted through conduit 48 in valve means 45. This causes piston 13 and connected piston rod 14 to move to the right, as seen in FIG. 1. Since piston rod 14 is connected to rack 15 by means of the connecting member 16, rack 15 including support 21 also move to the right. The stop 18–20 is adjustable by screwing or unscrewing bolt 19 thereby moving shaft 30 to the left or to the right. Since the right directional travel of the piston rod 14 is limited by the positioning of the adjustable stop 18–20, the distance moved to the right by the rack may be selectively predetermined.

The pinion gear 51 connected to the rack 15 and to the over-riding clutch 54 by means of shaft 53 does not cause rotation of shaft 55, when the rack 15 and piston rod 14 move to the right. Therefore, there is no registering of the rotation counter when the rack moves to the right.

Movement of the piston rod 14 to the right brings the device to operative position. When it is desired to count or register another volume of the tank, the handle 47 is moved to fluidly communicate fluid supply 46 with conduit 12 whereby fluid enters cylinder 10 and moves the piston 13 and connected piston rod 14 to the left. In the meantime, the conduit 11 is connected to the exhaust 48 through valve means 45. Movement of piston rod 14 to the left moves connected rack 15 to the left, which, in turn, rotates pinion gear 51 and connected shaft 53. In this position the over-riding clutch 54 connects shaft 55 with shaft 53 so that rotation of shaft 55 registers on rotation counter 56 connected thereto. The rack 15 moves to the left in support 22 until the end 15a of the rack 15 engages floating stop 24, which is positioned in support 22. The position of the inner end of floating stop 24 along the length of support 22 depends upon the position of the wedge stop 28. As readily seen, if wedge 28 extends further in recess 27, the position of the outer end of floating stop 24 will be at a thicker portion of the wedge 28. Thus, the tapered surface 29 moves floating stop 24 inwardly. The fluctuations in temperature within tank 40 causes the wedge stop 28 to move inwardly or outwardly. For example, the fluid in the bulb 38 expands or contracts depending upon whether the temperature is above or below a standard temperature. The transmitter valve means 36 transmits fluid pressure signals to motor 30 which vary according to expansion or contraction of the fluid in the bulb 38. Thus, a constant pressure is transmitted through conduit 35 to motor 30, which acts against the biased piston in motor 30 to maintain the wedge 28 at a particular position for a specified standard temperature. When the temperature within the tank 40 increases, an increased pressure signal is transmitted from supply 41 through the valve means 36 through the conduit 35, to move the piston in the motor 30 upwardly thereby moving the wedge stop 28 upwardly, which, in turn, moves the floating stop 24 inwardly or to the right. Such movement shortens the stroke or movement of rack 15. Contrariwise, when the fluid in the bulb 38 contracts, the valve means 36 transmits a lesser amount of pressure from the supply 41 through conduits 39 and 25 to the piston in motor 30 whereby the decreased pressure on the piston permits the spring or biasing means to move the piston and attached wedge 28 downwardly. The fluid pressure not transmitted through conduit 35 is exhausted through conduit 42. Thus, the wedge 28 has been repositioned and when the rack 15 moves to the left in the next cycle of operation, the new position of stop 24 will permit a longer travel for rack 15.

As an example, with wedge stop 28 positioned for a standard 60° F. within tank 40, the tank 40 is filled with liquid the temperature of which by means of bulb 38, valve means 36 and motor 30 varies the position of wedge stop 28, which, in turn, affects the position of the floating stop 24. The piston 13 is then moved to the right by controlling the fluid supply connected to valve means 45. When the rack has reached the end of its right directional movement, valve means 45 is turned to the position by which the piston 13 is moved to the left. The rack 15 then moves to the left until it strikes floating stop 24. During this latter movement pinion gear 51 and shaft 55 are rotated thereby actuating rotation counter 56. Thus, if the temperature of the liquid in the tank 40 were 80° F., the correction required would be approximately 1%. The floating stop 24 would be moved inwardly by movement of the wedge stop 28 upwardly into recess 27 thereby shortening the stroke of rack 15. This would cause the rack 15 to rotate pinion gear 51 and thereby the rotation counter 56 approximately .99 revolution and the counter 56 would then read 0.99 tank-full or barrel or other unit of measure employed. Similarly, a decreased temperature in tank 40 would increase the stroke of rack 15 which would increase the rotation of pinion gear 51, in turn increasing the amount of rotation of the counter 56 to more than one revolution thereby correcting for a decreased temperature and a consequent contracted volume of fluid in tank 40.

The operation of the device has been described in conjunction with temperature compensation; however, the temperature compensation variable stop 28 can be omitted and the apparatus may be employed as a volume calibrator for a tank or vessel. For example, if it is desired to decrease or increase the calibrated volume of a tank or vessel, the shaft 20 can be moved inwardly or outwardly by rotation of the nut 19 in member 18. In such event, the left floating stop 24 would be positioned at a specified constant distance from the stop 28. That is, the wedge may be replaced by a flat surface whereby the floating stop 24 is not moved by variations in temperature. Or the entire temperature compensating portion of the apparatus can be removed permitting the left wall of recess 27 of member 26 to function as the stop.

To illustrate this operation of compensating for a decrease or increase in volume from an original calibrated volume caused by accumulated sludge, dents or other reasons, the stop member 16 is moved to the left or right by movement of shaft 20 to the left or right. By such positioning the right directional stroke of rack 15 is shortened or lengthened. Hence, upon movement to the left, the pinion gear will rotate a lesser or greater amount, which, in turn, will rotate the counter a lesser or greater amount thereby providing a volume calibration for tank 40.

To avoid unnecessary detail, some support structure has been omitted from the drawing and description. Obviously, suitable supporting structure will be employed.

The term "liquid," as used herein, means primarily a liquid phase with or without a small amount of dissolved or entrained gases.

Although the apparatus has been described with regard to manual operation of the fluid supply to the cylinder 10, it is to be understood that the invention is readily useable in automatic metering operation. For example, the fluid-supply valve means 45 can be connected to a control system whereby a fluid pressure signal may be transmitted to conduit 12 when the tank 40 has filled to record or register a measured volume of liquid and a pressure signal may be transmitted to conduit 11 when the tank has emptied to reposition or reset rack 15. For an example of an automatic metering cycling operation, reference is made to U.S. patent application Serial No. 588,687, filed June 1, 1956, now U.S. Patent No. 2,872,817, entitled "Fluid Sampler" by William A. Pitts wherein a fluid sampler is actuated similarly to the automatic piston actuation contemplated by the present device.

Having fully described the operation, objects and elements of my invention, I claim:

1. Apparatus for correcting the volume of liquid being measured in a metering tank to compensate for volume differences of the liquid resulting from changes in a factor that affects the measurement of the volume of the liquid being measured comprising a cylinder; a piston slidably arranged in said cylinder; a piston rod connected to said piston and movable therewith; a rack connected to said piston rod and movable therewith; adjustable first stop means adapted to limit movement of said piston rod a selected distance in one direction; adjustable second stop means adapted to limit movement of said piston rod a selected distance in a reverse direction; a pinion gear engagedly connecting with said rack; a rotation counter adapted to measure the amount of rotation of said pinion gear; means interconnecting said gear and said counter; a clutch arranged on said interconnecting means adapted to actuate said counter when said piston rod is moved in said reverse direction and to prevent actuation of said counter when said piston rod moves in said one direction; movable means connected to said second stop means adapted to adjust said second stop means upon movement thereof; means responsive to changes in said factor adapted to move said movable means to adjust the position of said second stop means; a source of fluid pressure; and means connecting said source of fluid pressure to said cylinder for effecting a reciprocation of said piston.

2. Apparatus as recited in claim 1 wherein said factor is temperature.

3. Apparatus for correcting the volume of liquid being measured in a metering tank to compensate for volume differences of the liquid resulting from changes in a factor that affects the measurement of the volume of the liquid being measured comprising a cylinder; a piston slidably arranged in said cylinder; a piston rod connected to said piston and movable therewith; a rack; means interconnecting said rack and said piston rod; adjustable first stop means adapted to abut said interconnecting means upon movement of said piston rod a selected distance in one direction; second stop means adapted to abut said rack upon movement of said piston rod a selected distance in a reverse direction; means engagedly connecting with said second stop means adapted to move said second stop means in said one direction; means responsive to changes in said factor adapted to move said second stop means engaging means; a pinion gear engagedly meshing with said rack; a clutch; a first shaft interconnecting said pinion gear and said clutch; a rotation counter; a second shaft interconnecting said clutch and said rotation counter; said clutch being adapted to rotate said second shaft when said pinion gear rotates in one direction and to prevent rotation of said second shaft when said pinion gear rotates in a reverse direction; a source of fluid pressure; and means connecting said source of fluid pressure to said cylinder for effecting reciprocation of said piston.

4. Apparatus as recited in claim 3 wherein said factor is temperature.

5. Apparatus for correcting the volume of liquid being measured in a metering tank to compensate for volume differences of the liquid resulting from changes in a factor that affects the measurement of the volume of the liquid being measured comprising a cylinder; a piston slidably arranged in said cylinder; a piston rod connected to said piston; linearly movable means connected to said piston rod; means connected to said linearly movable means for translating said linear motion into rotational motion, the amount of rotation being proportional to the amount of linear movement; means connected to said translation means adapted to measure the amount of rotation and thereby the amount of travel of said linearly movable means; adjustable first stop means positioned adjacent one end of said linearly movable means adapted to limit movement thereof in one direction; adjustable second stop means positioned adjacent the other end of said linearly movable means adapted to limit movement thereof in a reverse direction; means responsive to changes in said factor adapted to vary the position of said second stop means; a source of fluid pressure; and means connecting said source of fluid pressure to said cylinder for effecting reciprocation of said piston.

6. Apparatus as recited in claim 5 wherein said factor is temperature.

7. Apparatus for correcting the volume of liquid being measured in a metering tank to compensate for volume differences of the liquid resulting from changes in a factor that affects the measurement of the volume of the liquid being measured, comprising first means movable variable amounts to selected positions, each position being representative of selected volumes of said liquid; second means automatically movable in response to changes in said factor engagedly connecting with said first movable means to terminate said movement of said first movable means at one of said selected positions, the amount of movement of said first movable means as determined by said selected positions being dependent upon the change in said factor.

8. Apparatus as recited in claim 7 wherein said factor is temperature.

9. Apparatus as recited in claim 8 including fluid pressure means connected to said movable means adapted to move said movable means.

10. Apparatus for correcting the volume of liquid being measured in a metering tank to compensate for volume differences of the liquid resulting from changes in a factor that affects the measurements of the volume of the liquid being measured comprising fluid pressure responsive movable means adapted to move selected amounts representative of selected volumes of said liquid; linearly movable means connected to said fluid pressure responsive movable means; rotatable means connected to said linearly movable means adapted to translate said linear motion into rotational motion, the amount of rotation of said rotatable means being proportional to the amount of linear movement of said linearly movable means; means engagedly connecting with said movable means for limiting the amount of movement of said movable means in response to changes in said factor; means connected to said rotatable means adapted to register the amount of rotation of said rotatable means; a source of fluid pressure; and means connecting said source of fluid pressure to said fluid pressure movable means.

11. Apparatus as recited in claim 10 wherein said factor is temperature.

12. Apparatus for correcting the volume of liquid being measured in a metering tank to compensate for volume differences of the liquid resulting from changes in a factor that affects the measurements of the volume of the liquid being measured comprising a reciprocal fluid pressure responsive movable means; linearly movable means connected to said pressure responsive movable means; rotatable means connected to said linearly movable means adapted to translate said linear motion into rotational motion; means connected to said rotatable means adapted to register the amount of rotation of said rotatable means; stop means positioned adjacent one end of said linearly movable means adapted to limit the amount of movement thereof in one direction; adjustable stop means positioned adjacent the other end of said linearly movable means adapted to limit the amount of movement thereof in the opposite direction, the positioning of said adjustable stop means being responsive to the amount of change of said factor; a source of fluid pressure; and means connecting said source of fluid pressure to said fluid pressure responsive means for effecting reciprocation thereof.

13. Apparatus as recited in claim 12 wherein said factor is temperature.

14. Apparatus for correcting the volume of liquid being measured in a metering tank to compensate for volume differences of the liquid resulting from changes in a factor that affects the measurement of the volume of the liquid being measured comprising first means movable variable amounts to selected positions, each position being representative of selected volumes of said liquid; means connected to said first movable means for moving said first movable means; second means automatically movable in response to changes in said factor engagedly connecting with said first movable means to terminate said movement of said first movable means at one of said selected positions, the amount of movement of said first movable means as determined by said selected positions being dependent upon the change in said factor.

15. Apparatus as recited in claim 14 wherein said factor is temperature.

References Cited in the file of this patent

UNITED STATES PATENTS

| | | |
|---|---|---|
| 844,958 | Riggs | Feb. 19, 1907 |
| 1,393,421 | Baker | Oct. 11, 1921 |
| 2,438,935 | Marsh | Apr. 6, 1948 |
| 2,806,374 | Granberg | Sept. 17, 1957 |
| 2,876,641 | Brown | Mar. 10, 1959 |

FOREIGN PATENTS

| | | |
|---|---|---|
| 358,452 | Germany | Sept. 9, 1922 |